(12) United States Patent
Asai

(10) Patent No.: US 12,617,019 B2
(45) Date of Patent: May 5, 2026

(54) AM APPARATUS

(71) Applicant: EBARA CORPORATION, Tokyo (JP)

(72) Inventor: Junki Asai, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 336 days.

(21) Appl. No.: 18/264,802

(22) PCT Filed: Feb. 4, 2022

(86) PCT No.: PCT/JP2022/004388
§ 371 (c)(1),
(2) Date: Aug. 9, 2023

(87) PCT Pub. No.: WO2022/196163
PCT Pub. Date: Sep. 22, 2022

(65) Prior Publication Data
US 2024/0100602 A1      Mar. 28, 2024

(30) Foreign Application Priority Data

Mar. 19, 2021      (JP) ................................. 2021-046034

(51) Int. Cl.
B29C 64/255      (2017.01)
B22F 12/00      (2021.01)
(Continued)

(52) U.S. Cl.
CPC ............ B22F 12/55 (2021.01); B22F 12/222 (2021.01); B22F 12/224 (2021.01); B22F 12/52 (2021.01);
(Continued)

(58) Field of Classification Search
CPC ... B29C 64/141; B29C 64/153; B29C 64/255; B29C 64/307; B29C 64/314; B29C 64/321
See application file for complete search history.

(56) References Cited

U.S. PATENT DOCUMENTS

2017/0259337 A1      9/2017  Furukawa
2019/0134892 A1*     5/2019  Mamrak ................ B33Y 10/00
(Continued)

FOREIGN PATENT DOCUMENTS

EP      4026634 A1     7/2022
EP      4227225 A1     8/2023
(Continued)

OTHER PUBLICATIONS

International Search Report issued in Patent Application No. PCT/JP2022/004388 dated Mar. 8, 2022.

*Primary Examiner* — Yung-Sheng M Tsui
(74) *Attorney, Agent, or Firm* — Chrisman Gallo Tochtrop LLC

(57) ABSTRACT

The present disclosure provides a structure for replenishing a powder material to a material supply device during fabrication using the AM technique. According to one aspect, an AM apparatus is provided. This AM apparatus includes a DED nozzle configured to eject a powder material, a gantry mechanism configured to move the DED nozzle, and a powder supply device configured to supply the powder material to the DED nozzle. The gantry mechanism includes a Y-axis member movable in a horizontal X direction and extending in a horizontal Y direction perpendicular to the X direction. The DED nozzle and the material supply device are mounted on the Y-axis member of the gantry mechanism. The gantry mechanism includes a Y-axis movement mechanism for moving the DED nozzle and the material supply device along the Y direction on the Y-axis member.

15 Claims, 13 Drawing Sheets

(51) Int. Cl.

| | | |
|---|---|---|
| *B22F 12/52* | (2021.01) | |
| *B22F 12/53* | (2021.01) | |
| *B22F 12/55* | (2021.01) | |
| *B22F 12/70* | (2021.01) | |
| *B22F 12/90* | (2021.01) | |
| *B33Y 30/00* | (2015.01) | |
| *B33Y 50/02* | (2015.01) | |

(52) U.S. Cl.
CPC .............. *B22F 12/53* (2021.01); *B22F 12/70* (2021.01); *B22F 12/90* (2021.01); *B33Y 30/00* (2014.12); *B33Y 50/02* (2014.12)

(56) References Cited

U.S. PATENT DOCUMENTS

| | | |
|---|---|---|
| 2019/0240773 A1* | 8/2019 | Carter ..................... B22F 10/28 |
| 2019/0248070 A1 | 8/2019 | Hsieh et al. |
| 2019/0375156 A1 | 12/2019 | Knox |
| 2020/0130264 A1 | 4/2020 | Fukase et al. |
| 2020/0180222 A1 | 6/2020 | Suzuki |
| 2020/0246870 A1* | 8/2020 | Parrish ................... B33Y 40/00 |
| 2020/0262147 A1 | 8/2020 | Mamrak |

FOREIGN PATENT DOCUMENTS

| | | | |
|---|---|---|---|
| JP | S57-004522 A | 1/1982 | |
| JP | H10-278902 A | 10/1998 | |
| JP | 2013-029571 A | 2/2013 | |
| JP | 2019-137038 A | 8/2019 | |
| JP | 2020-069662 A | 5/2020 | |
| WO | 2017/081813 A1 | 5/2017 | |
| WO | 2020/089538 A1 | 5/2020 | |
| WO | 2021/044747 A1 | 3/2021 | |
| WO | WO-2022197612 A1 * | 9/2022 | .............. B22F 12/50 |

* cited by examiner

334t

ADHESION OF POWDER MATERIAL:
NONE

POWDER FLOW AMOUNT

334t

ADHESION OF POWDER MATERIAL:
INTERMEDIATE DEGREE

POWDER FLOW AMOUNT

334t

ADHESION OF POWDER MATERIAL:
HIGH DEGREE

POWDER FLOW AMOUNT

AM APPARATUS

TECHNICAL FIELD

The present application relates to an AM apparatus. The present application claims priority under the Paris Convention to Japanese Patent Application No. 2021-46034 filed on Mar. 19, 2021. The entire disclosure of Japanese Patent Application No. 2021-46034 including the specification, the claims, the drawings, and the abstract is incorporated herein by reference in its entirety.

BACKGROUND ART

There are known techniques for directly fabricating a three-dimensional object based on three-dimensional data on a computer that expresses the three-dimensional object. Known examples thereof include the Additive Manufacturing (AM) technique. As one example thereof, Direct Energy Deposition (DED) is available as the AM technique employing the deposition method. DED is a technique that carries out fabrication by melting and solidifying a metal material together with a base material using an appropriate heat source while supplying the metal material locally. Further, Powder Bed Fusion (PBF) is available as one example of the AM technique. In PBF, each layer of the three-dimensional object is fabricated by subjecting two-dimensionally bedded metal powder to irradiation of a fabrication target portion thereof with a laser beam or an electron beam serving as a heat source, and melting and solidifying or sintering the metal powder. In PBF, the desired three-dimensional object can be fabricated by repeating such a process.

CITATION LIST

Patent Literature

PTL 1: Japanese Patent Application Laid-Open No. H10-278902
PTL 2: Japanese Patent Application Laid-Open No. 2019-137038

SUMMARY OF INVENTION

Technical Problem

In any of the DED method and the PBF method, the fabrication based on the AM technique is used to manufacture a comparatively small-sized fabrication object at present. Manufacturing a relatively large-sized fabrication object using the AM technique leads to the necessity of a large amount of powder material, and makes it important to appropriately supply the powder material. In a case where the large-sized fabrication object is manufactured by the DED method, a material supply device that supplies the powder material to a DED nozzle should be provided, but the material supply device may be unable to hold the powder material by a sufficient amount when the intended fabrication object is large. For example, if the powder supply device is set up outside a fabrication region and is configured to supply the powder material to a movable DED nozzle, such a configuration allows a large-sized material supply device to be provided to the AM apparatus. However, because the DED nozzle carries out the fabrication while moving in the fabrication region, a material supply tube extending from the material supply device to the DED nozzle may be deformed according to the movement of the DED nozzle, making stable supply of the material difficult. On the other hand, if the material supply device is configured movably together with the DED nozzle, the flow path of the material supply tube is stabilized, and the powder material can be stably supplied to the DED nozzle. However, configuring the material supply device movably together with the DED nozzle makes it difficult to increase the size of the material supply device. This raises the necessity of replenishing the powder material to the material supply device during the fabrication. One of objects of the present invention is to provide a structure for replenishing a powder material to a material supply device during fabrication using the AM technique.

Solution to Problem

According to one aspect, an AM apparatus is provided. This AM apparatus includes a DED nozzle configured to eject a powder material, a gantry mechanism configured to move the DED nozzle, and a powder supply device configured to supply the powder material to the DED nozzle. The gantry mechanism includes a Y-axis member movable in a horizontal X direction and extending in a horizontal Y direction perpendicular to the X direction. The DED nozzle and the material supply device are mounted on the Y-axis member of the gantry mechanism. The gantry mechanism includes a Y-axis movement mechanism for moving the DED nozzle and the material supply device along the Y direction on the Y-axis member.

DESCRIPTION OF EMBODIMENTS

Figure 1:
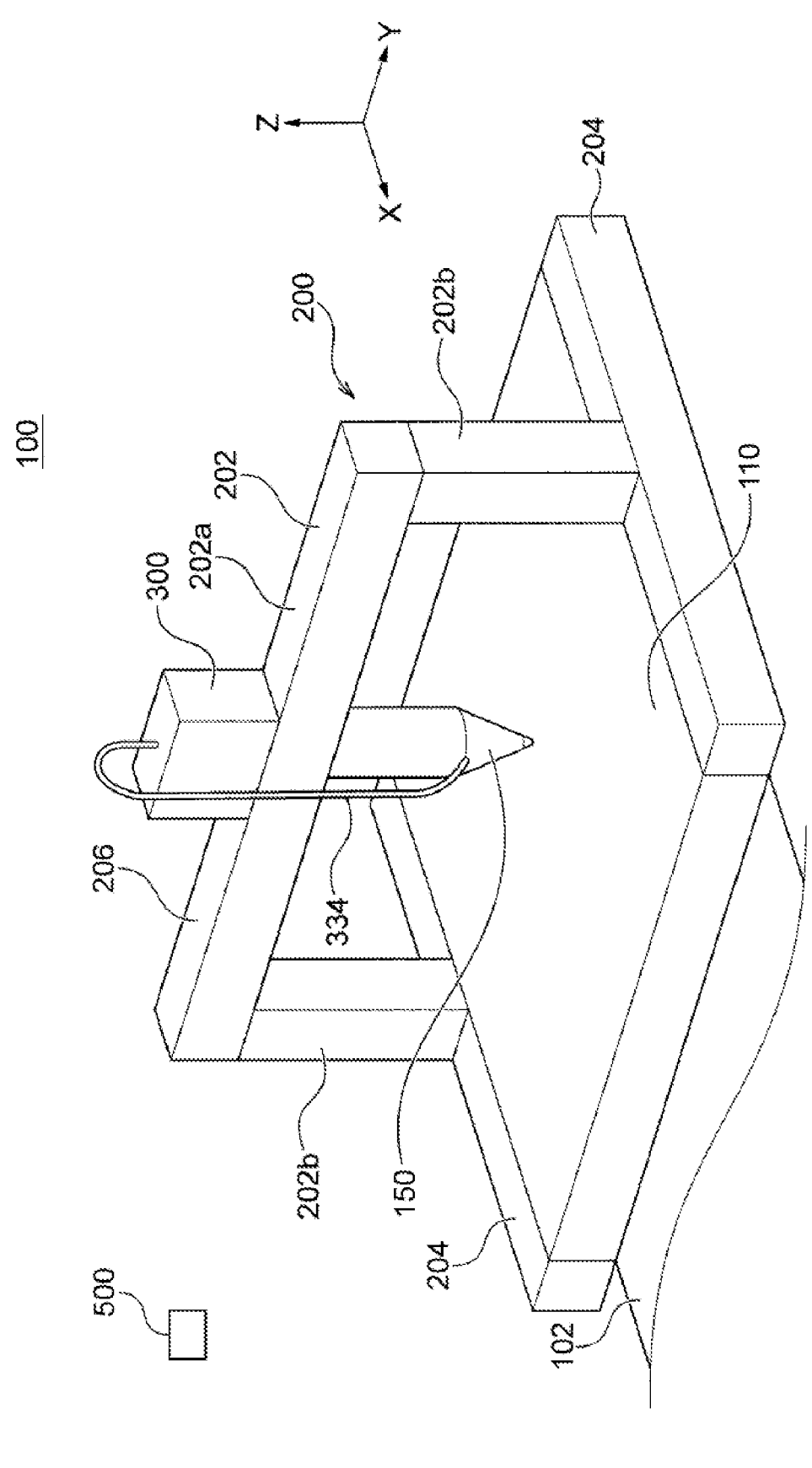
FIG. 1 schematically illustrates an AM apparatus for manufacturing a fabrication object according to one embodiment.

In the following description, embodiments of an AM apparatus for manufacturing a fabrication object according to the present invention will be described with reference to the accompanying drawings. In the accompanying drawings, the same or similar components will be indicated by the same or similar reference numerals, and redundant descriptions regarding the same or similar components may be omitted in the description of each of the embodiments. Further, features described in each of the embodiments are also applicable to other embodiments in so far as they do not contradict each other.

FIG. 1 schematically illustrates an AM apparatus for manufacturing a fabrication object according to one embodiment. As illustrated in FIG. 1, the AM apparatus includes a base plate 102. A fabrication object is going to be fabricated on the base plate 102. The base plate 102 can be a plate made from an arbitrary material capable of supporting the fabrication object. In one embodiment, the base plate 102 is coupled with a lift mechanism movable in a height direction (a z direction). For example, after one layer is fabricated using a DED nozzle 150, the base plate 102 is lowered as long as the thickness of the fabricated one layer using the lift mechanism, and the next layer is fabricated. A three-dimensional structure can be fabricated by repeating that. In one embodiment, the base plate 102 may be coupled with an XY stage movable in an X direction and a Y direction perpendicular to each other in a horizontal plane.

The AM apparatus 100 includes the DED nozzle 150 for ejecting a powder material. The DED nozzle 150 is mounted on a gantry mechanism 200 for moving the DED nozzle 150 in the X and Y directions perpendicular to each other in the horizontal plane. Further, a material supply device 300 for supplying carrier gas and the powder material to the DED nozzle 150 is mounted on the gantry mechanism 200.

In one embodiment, as illustrated in FIG. 1, the gantry mechanism 200 includes a Y-axis member 202 movable in the X direction and extending in the Y direction perpendicular to the X direction. The Y-axis member 202 is a gate-like structure including a horizontal portion 202*a* extending in the Y direction above a fabrication region 110 and a vertical portion 202*b* extending from each of the both ends of the horizontal portion 202*a* toward the fabrication region 110 downward (in the Z direction) as illustrated in FIG. 1. The vertical portion 202*b* of the Y-axis member 202 is coupled with an X-axis movement mechanism 204. In one embodiment, the X-axis movement mechanism 204 can be, for example, a movement mechanism including a ball screw. As illustrated in FIG. 1, the X-axis movement mechanism 204 is disposed along the X axis at each of the both ends of the fabrication region 110 in the Y direction.

In one embodiment, the Y-axis member 202 of the gantry mechanism 200 includes a Y-axis movement mechanism 206 for moving the DED nozzle 150 and the material supply device 300 along the Y direction on the horizontal portion 202*a* of the Y-axis member 202. In one embodiment, the Y-axis movement mechanism 206 can be, for example, a movement mechanism including a ball screw. In the embodiment illustrated in FIG. 1, the DED nozzle 150 and the material supply device 300 are simultaneously moved in the Y direction by the Y-axis movement mechanism 206.

In one embodiment, the Y-axis member 202 includes a Z-axis movement mechanism for moving the DED nozzle 150 in the Z direction. In one embodiment, the Z-axis movement mechanism can be, for example, a movement mechanism including a ball screw. The Z direction is a direction perpendicular to the X direction and the Y direction, and can also be stated as the height direction. The distance of the DED nozzle 150 to the fabrication region 110 can be adjusted by moving the DED nozzle 150 in the Z direction.

In one embodiment, the AM apparatus includes a control device 500. The control device 500 is configured to control the operations of various kinds of operation mechanisms of the AM apparatus. The control device 500 can be constituted by a general computer or a dedicated computer.

Figure 2:
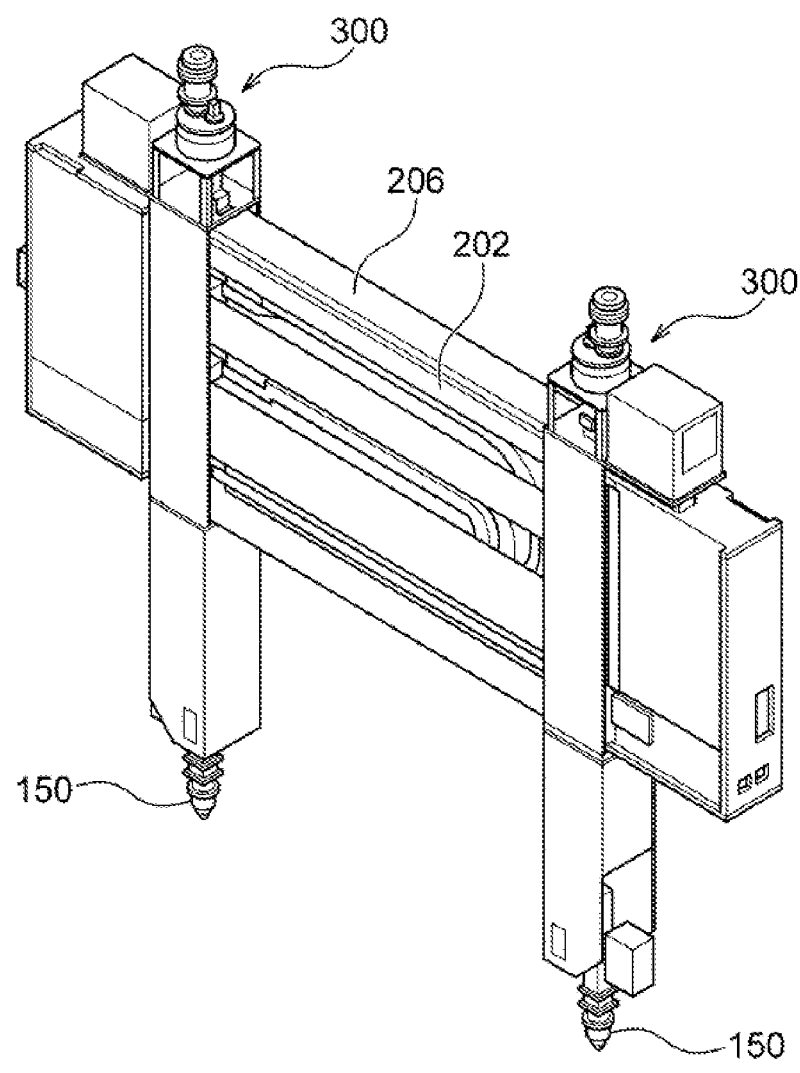
FIG. 2 is a perspective view schematically illustrating a Y-axis member with a DED nozzle and a material supply device mounted thereon according to one embodiment.

FIG. 2 is a perspective view schematically illustrating the Y-axis member 202 with the DED nozzle 150 and the material supply device 300 mounted thereon according to one embodiment. In the embodiment illustrated in FIG. 2, the Y-axis member 202 includes two DED nozzles 150 and two material supply devices 300. The embodiment illustrated in FIG. 2 includes one material supply device 300 for supplying the powder material for one DED nozzle 150, but may be configured in such a manner that the powder material can be supplied from one material supply device 300 to two DED nozzles 150.

Figure 3:
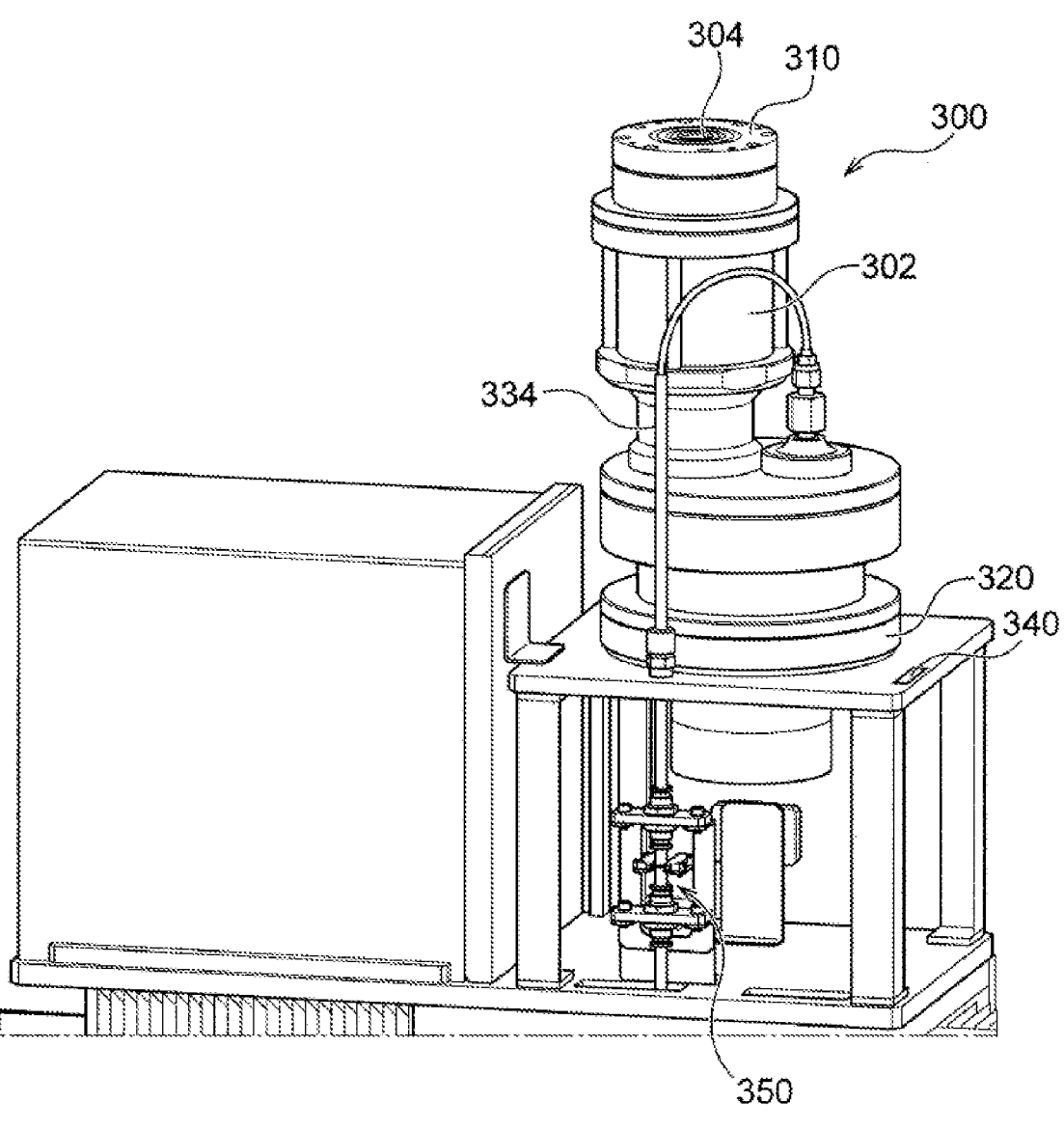
FIG. 3 is a perspective view schematically illustrating the material supply device according to one embodiment.
Figure 4:
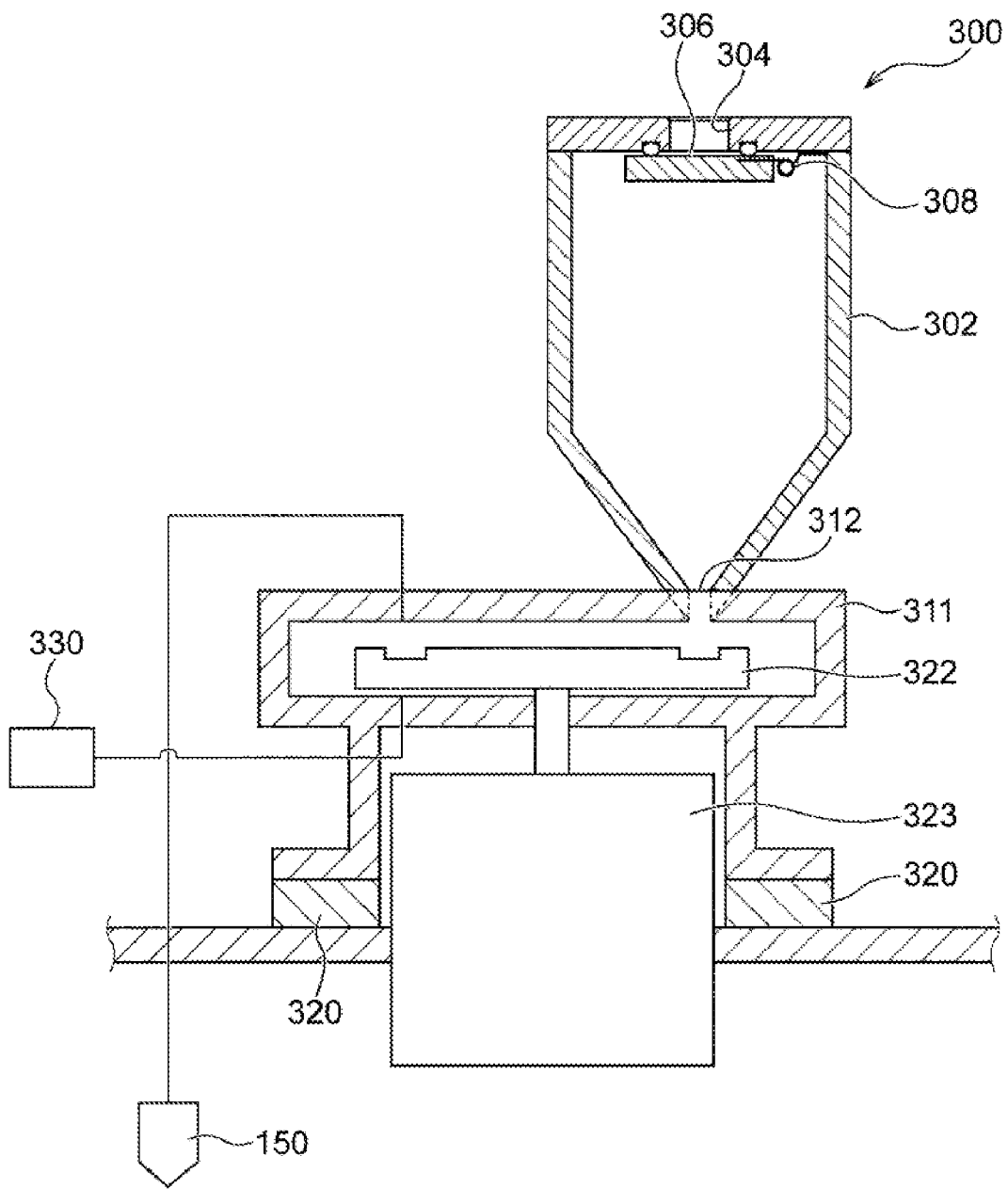
FIG. 4 is a cross-sectional view schematically illustrating the material supply device according to one embodiment.

FIG. 3 is a perspective view schematically illustrating the material supply device 300 according to one embodiment. FIG. 4 is a cross-sectional view schematically illustrating the structure of the material supply device 300 according to one embodiment. The material supply device 300 according to the one embodiment includes a hopper 302 for holding the powder material. The hopper 302 has a function as a container that holds the powder material. An opening 304 is provided on the upper surface of the hopper 302. The powder material is supplied from the opening 304 into the hopper 302. As illustrated in FIG. 4, a closing member 306 for closing the opening 304 is attached to the upper surface of the hopper 302. The closing member 306 is biased in a direction for closing the opening 304 by an elastic member 308. In one embodiment, the elastic member 308 can be a torsion spring.

Figure 5:
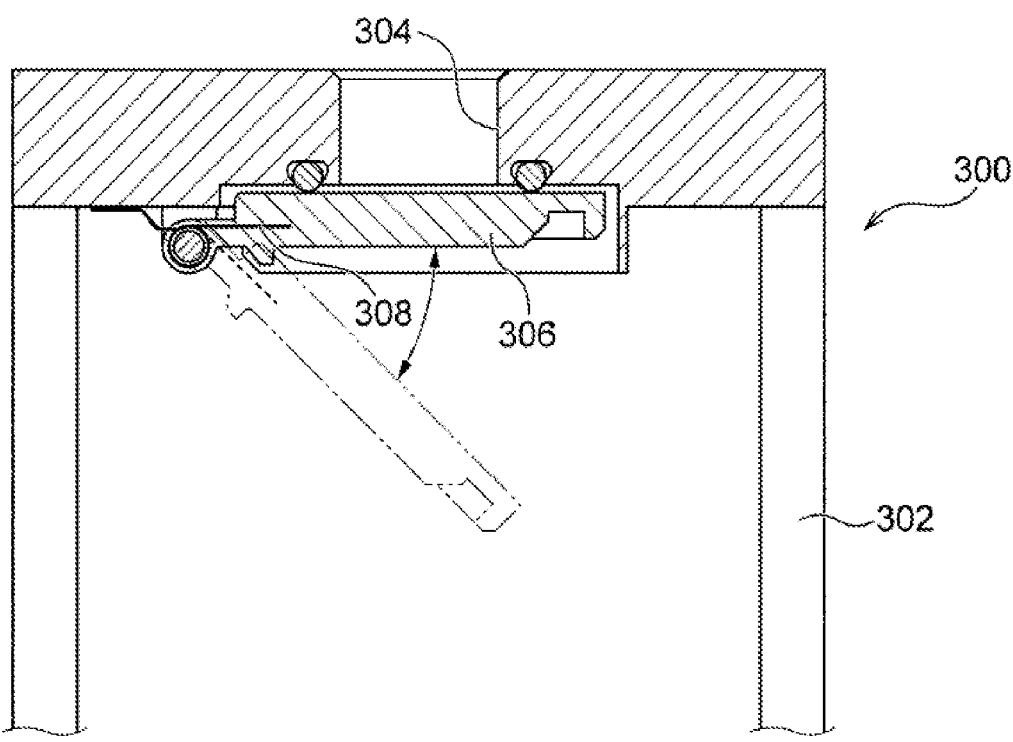
FIG. 5 is a cross-sectional view schematically illustrating a cap attached to a hopper according to one embodiment.

In one embodiment, a cap 310 can be provided at the upper end of the hopper 302. The cap 310 includes the opening 304, the closing member 306, and the elastic member 308 like the above-described examples. FIG. 5 is a cross-sectional view schematically illustrating the cap 310 attached to the hopper 302 according to one embodiment. Further, in one embodiment, a cover disclosed in Japanese Patent Application No. 2020-169369 can also be used as the cap 310 attached to the hopper 302.

Figure 6:
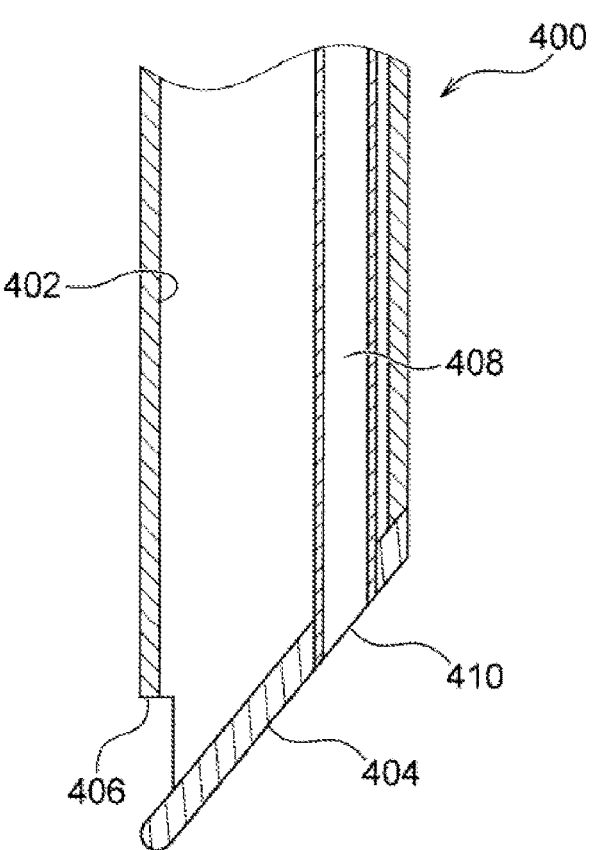
FIG. 6 is a cross-sectional view schematically illustrating the structure of a material replenishment tube according to one embodiment.

In one embodiment, the powder material can be supplied into the hopper 302 via the opening 304 using a material replenishment tube. FIG. 6 is a cross-sectional view schematically illustrating the structure of a material replenishment tube 400 according to one embodiment. In the embodiment illustrated in FIG. 6, the material replenishment tube 400 is substantially cylindrically structured. In one embodiment, the material replenishment tube 400 includes a powder passage 402 used for the powder material to pass therethrough. In the embodiment illustrated in FIG. 6, the end portion of the material replenishment tube 400 inserted in the opening 304 of the hopper 302 includes a tapered surface 404. In the illustrated material replenishment tube 400, a powder port 406 for supplying the powder material into the hopper 302 is provided on the side surface of the material replenishment tube 400 adjacent to the lowest position of the tapered surface 404.

In one embodiment, the material replenishment tube 400 includes a gas passage 408 used for gas to pass therethrough as illustrated in FIG. 6. An opening 410 in communication with the gas passage 408 is provided on the tapered surface 404.

Figure 7:
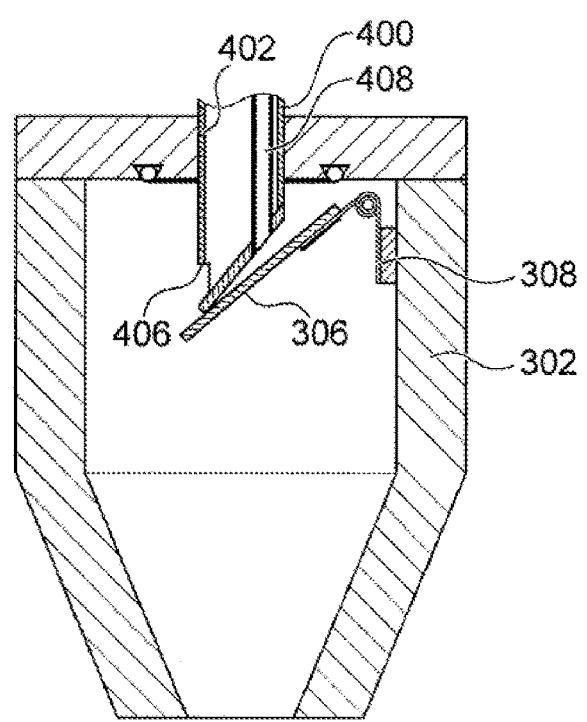
FIG. 7 is a cross-sectional view schematically illustrating how the material replenishment tube is inserted in the hopper according to one embodiment.

FIG. 7 is a cross-sectional view schematically illustrating how the material replenishment tube 400 is inserted in the hopper 302 according to one embodiment. In the embodiment illustrated in FIGS. 6 and 7, inserting the material replenishment tube 400 into the opening 304 of the hopper 302 causes the material replenishment tube 400 to push down the closing member 306, allowing the material replenishment tube 400 to access inside the hopper 302. In the embodiment illustrated in FIGS. 6 and 7, the end portion of the material replenishment tube 400 is the tapered surface 404, and the powder port 406 is provided on the side surface. Therefore, after passing through the powder passage 402, the powder material is supplied from the powder port 406 in an oblique direction along the tapered surface 404 serving as the bottom surface. As a result, the powder material can be prevented from adhering to the upper surface of the closing member 306. If the powder material adheres to the upper surface of the closing member 306, this becomes a cause for impairing the sealing performance of the closing member 306. Further, while the powder material is supplied from the material replenishment tube 400 into the hopper 302, air in the hopper 302 can be discharged out of the hopper 302 via the opening 410 and the gas passage 408.

In one embodiment, the material supply device 300 includes a weight sensor 320 for measuring the weight of the powder material supplied from the hopper 302 to the DED nozzle 150 as illustrated in FIG. 4. As illustrated in FIG. 4, the weight sensor 320 is configured to be able to measure the weights of a weighing disk 322 disposed in a case 311 coupled with a hopper exit 312 of the hopper 302 and the powder material supplied to the weighing disk 322. The weighing disk 322 is coupled with a motor 323, and is rotatably configured. A gas supply tube 332 extending from the carrier gas source 330 is coupled with the case 311. Further, a powder supply tube 334 for supplying the carrier gas and the powder material to the DED nozzle 150 is coupled with the weighing disk 322. The powder material supplied from the hopper 302 to the weighing disk 322 is supplied from the powder supply tube 334 to the DED nozzle 150 together with the carrier gas. The weight of the powder material supplied from the hopper 302 to the DED nozzle 150, i.e., the weight of the consumed powder material can be identified by using the material supply device 300 including the weight sensor 320 configured in the above-described manner. Further, in one embodiment, the weight sensor 320 may be configured to measure the weights of the hopper 302 and the powder material held in the hopper 302.

As described with reference to FIG. 1, the material supply device 300 is movable in the Y direction (the horizontal direction) by the Y-axis movement mechanism 206, and, further, the Y-axis member 202 is also movable in the X direction since being coupled with the X-axis movement mechanism 204. Therefore, the material supply device 300 including the weight sensor 320 is movable in the X direction and the Y direction (i.e., the two directions perpendicular to each other in the horizontal plane), and therefore the weight sensor 320 is also subjected to accelerations in the X direction and the Y direction. In light thereof, desirably, a sensor not broken even when being subjected to accelerations in the X direction and the Y direction is used as the weight sensor 320. For example, in a case of a weight sensor designed with a rated capacity of 15 kg and a maximum load of 150%, the weight sensor is expected to be able to tolerate up to 0.5 G in total as the acceleration(s) in the X direction and/or the Y direction when a load of 15 kg (a total weight of the hopper 320, the powder material, and the like) is placed on the weight sensor. Then, "G" represents a gravitational acceleration ($=9.8$ m/s$^2$).

However, the weight sensor 320 having a large rated capacity is accompanied by a reduction in the resolution of measuring a weight. Therefore, the operations of the X-axis movement mechanism 204 and the Y-axis movement mechanism 206 may be controlled so as to reduce the horizontal acceleration without increasing the rated capacity of the weight sensor 320 so much. In one embodiment, the material supply device 300 includes an acceleration sensor 340 as illustrated in FIG. 3. Desirably, the acceleration sensor 340 can measure accelerations in two directions, the X direction and the Y direction. Alternatively, two acceleration sensors each capable of measuring an acceleration in one direction may be provided to the material supply device 300 so as to allow the material supply device 300 to measure the accelerations in the X direction and the Y direction. In one embodiment, a capacitive-type acceleration sensor or an acceleration sensor based on another arbitrary measurement method can be used as the acceleration sensor 340.

In one embodiment, the X-axis movement mechanism 204 and the Y-axis movement mechanism 206 are controlled in such a manner that the accelerations in the X direction and the Y direction are kept equal to or lower than a predetermined value. More specifically, the control device 500 receives an output from the acceleration sensor 340, and controls the operations of the X-axis movement mechanism 204 and the Y-axis movement mechanism 206 based on the output from the acceleration sensor 340. In one embodiment, the material supply device 300 may be configured to control the operations of the X-axis movement mechanism 204 and the Y-axis movement mechanism 206 within a range that allows the accelerations in the X direction and the Y direction to be kept equal to or lower than the predetermined value without including the acceleration sensor 340.

In one embodiment, the weight sensor 320 is configured to measure the weight only when the material supply device 300 is stopped or is in uniform motion. Configuring the weight sensor 320 to measure the weight only when being stopped or in uniform motion allows the weight sensor 320 to measure the weight without being subjected to a horizontal acceleration, thereby allowing the weight sensor 320 to correctly measure the weight.

As illustrated in FIGS. 3 and 4, the material supply device 300 includes the powder supply tube 334 for supplying the powder material supplied from the hopper 302 to the DED nozzle 150. In the illustrated embodiment, one end of the powder supply tube 334 is coupled with the weighing disk 322, and the other end of the powder supply tube 334 is coupled with the DED nozzle 150.

Figure 8:
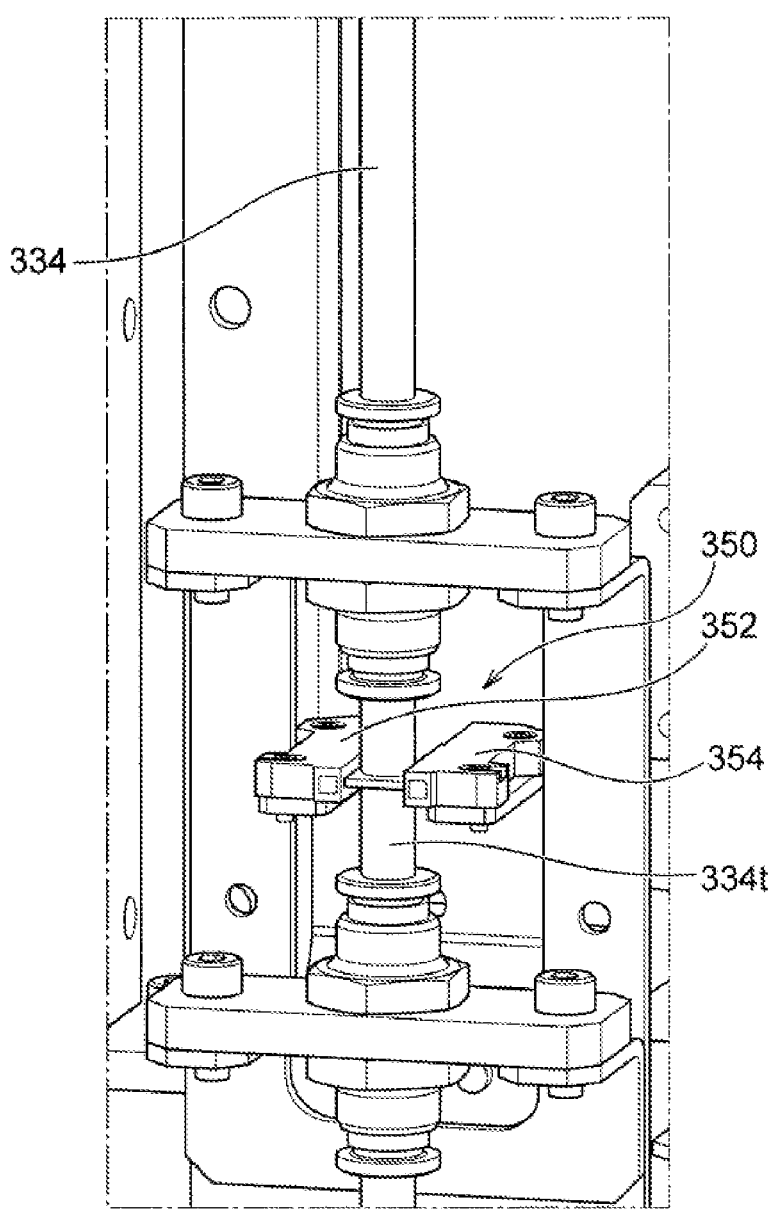
FIG. 8 is an enlarged view around a sensor illustrated in FIG. 3.

In one embodiment, the material supply device 300 includes a sensor 350 for measuring the amount of the powder material passing through the powder supply tube 334. FIG. 8 is an enlarged view around the sensor 350 illustrated in FIG. 3. In one embodiment, a part of the powder supply tube 334 is constituted by a transparent tube 334*t*, which is optically transparent, as illustrated in FIG. 8.

In the present embodiment, the sensor 350 includes a light source 352 for irradiating the transparent tube **334*t* with light and a light-receiving element 354 for receiving the light transmitted through the transparent tube 334*t*. As illustrated in FIG. 8, the light source 352 and the light-receiving element 354 are disposed on one side and the other side of the transparent tube 334*t*, respectively. In one embodiment, the light source 352 can be an LED light source. Further, the sensor 350 in FIG. 8 is a transmission-type sensor, but a reflection-type sensor may be employed as another embodiment. As the reflection-type sensor, for example, the sensor 350 may be constructed in such a manner that a reflection plate is disposed at the position of the light-receiving element 354 in the above-described drawing, FIG. 8 and a light source and a light-receiving element are disposed at the position of the light source 352 in the above-described drawing, FIG. 8**, and light reflected from the reflection plate is received by the light-receiving element.

Figure 9:
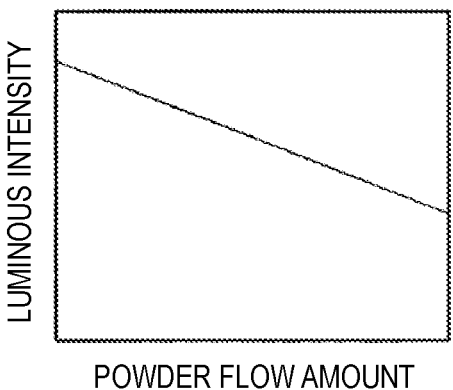
FIG. 9 is one example of a graph indicating the relationship between a flow amount of powder passing through a transparent tube and a luminous intensity detected by a light-receiving element according to one embodiment.

In the case where the optical sensor 350 illustrated in FIG. 8 is used, a flow of the powder material passing through the transparent tube **334*t* is irradiated with the light. As the powder material passes through the transparent tube 334*t* by a larger amount, the light is more attenuated and the light received by the light-receiving element 354 has a lower luminous intensity. For example, FIG. 9 is one example of a graph indicating the relationship between the flow amount of the powder passing through the transparent tube 334*t* and the luminous intensity detected by the light-receiving element 354. Pre-measuring a calibration curve indicating the relationship between the amount of the powder material passing through the transparent tube 334*t* and the luminous intensity like the illustrated example allows the flow amount of the powder material passing through the transparent tube 334*t* to be detected by measuring the luminous intensity. The amount of the powder material supplied from the hopper 302 to the DED nozzle 150, i.e., the amount of the powder material consumed in the AM fabrication can be measured by integrating the luminous intensity of the light received by the light-receiving element 354 over time. Further, identifying the consumed amount of the powder material also makes it possible to estimate the remaining amount of the powder material held in the hopper 302**.

If a non-electroconductive material is used as the material of the transparent tube **334*t*, the powder material may adhere to the inner surface of the transparent tube 334*t* due to an elastic force, hindering the sensor 350 from appropriately measuring the amount of the powder material passing through the transparent tube 334*t*. In light thereof, in one embodiment, the transparent tube 334*t* can be made from an electroconductive material. Further, in one embodiment, the transparent tube 334*t* may be made from an electroconductive material or a non-electroconductive material subjected to an anti-static treatment. Semi-conductive polyurethane, transparent electroconductive glass, or another arbitrary material can be used as the electroconductive transparent material. Further, a PFA-AS tube (Nichias Corporation) can also be used as the transparent tube 334*t*** subjected to the anti-static treatment.

Figure 10:
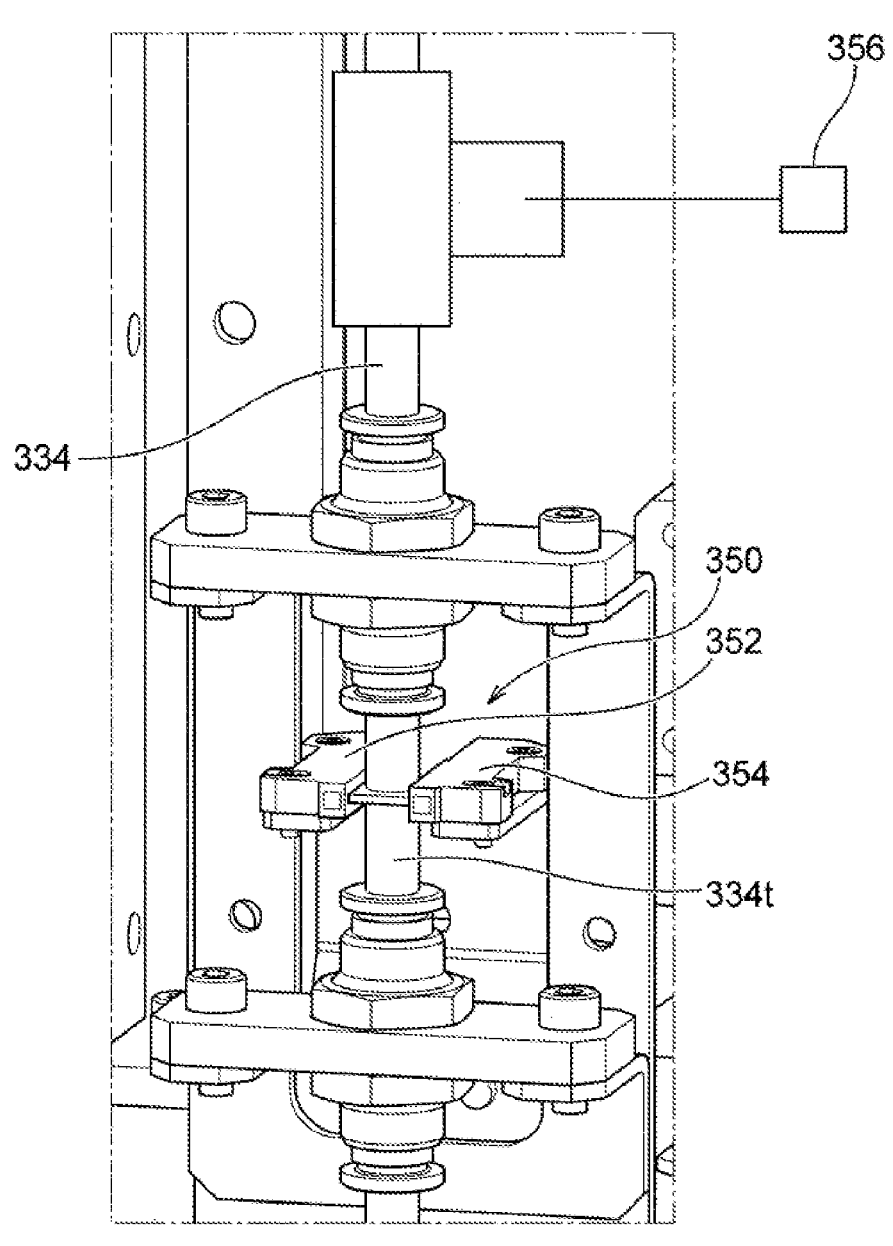
FIG. 10 is an enlarged view around the sensor illustrated in FIG. 3 according to one embodiment.

FIG. 10 is an enlarged view around the sensor 350 illustrated in FIG. 3 according to one embodiment. In the embodiment illustrated in FIG. 10, a branch portion is provided upstream of the transparent tube **334*t*, and one end of the branch portion is coupled with a gas source 356. In the embodiment illustrated in FIG. 10, pressurized gas can be supplied from the gas source 356 to the transparent tube 334*t*. The gas in the gas source 356 can be the same gas as the carrier gas, and can be, for example, argon gas. Further, the gas source 330 of the carrier gas may be used as the gas source 356. In the embodiment illustrated in FIG. 10, the powder material adhering to the surface of the transparent tube 334*t* can be swept away by feeding the pressurized gas from the gas source 356 to the transparent tube 334*t*. For example, the present embodiment can operate so as to allow the powder material adhering to the surface of the transparent tube 334*t* to be swept away by feeding the pressurized gas from the gas source 356 to the transparent tube 334*t* after the fabrication for one layer by the DED nozzle 150 is ended. Alternatively, as one embodiment, the branch portion and the gas source 356 provided as illustrated in FIG. 10 may be omitted, and the carrier gas for transporting the powder material supplied from the hopper 302 to the DED nozzle 150 may be supplied from the carrier gas source 330 to the powder supply tube 334 and the transparent tube 334*t*** at a high pressure in a state that the powder material is not supplied.

The powder material may be entwined with unevenness of the inner surface of the transparent tube **334*t* and the powder material adhering to the transparent tube 334*t* may get stuck there even when, for example, a treatment for preventing static charge is applied to the transparent tube 334*t* or the powder material adhering to the transparent tube 334*t* is removed using the high-pressure gas as described above. In this case, the transparency of the transparent tube 334*t* changes as the usage time increases, which hinders the consumed amount of the powder material from being correctly measured by an optical method working in the above-described manner. Therefore, it is desirable to use the transparent tube 334*t* having a smooth inner surface that makes it difficult for the powder material to get stuck thereon. Desirably, the surface roughness of the inner surface of the transparent tube 334*t* is equal to or lower than a half of an average particle diameter of the powder material in use. The surface roughness refers to a width dimension of a recessed portion of the unevenness of the inner surface of the transparent tube 334*t*. As one example, in a case where the powder material having an average particle diameter of 50 μm is used, the dimension of the recessed portion of the unevenness of the inner surface of the transparent tube 334*t*** is desirably 25 μm or smaller.

In one embodiment, the AM apparatus can be set so as to carry out the AM fabrication after continuously feeding the powder material through the transparent tube **334*t* only for a predetermined time and causing the powder material to adhere to the transparent tube 334*t* by a predetermined amount, when the transparent tube 334*t* is replaced with a new one. In the case of the brand-new transparent tube 334*t*, the powder material easily adheres thereto and a considerable change occurs in the transparency that the transparent tube 334*t* has when the AM fabrication is in progress. The change in the transparency of the transparent tube 334*t* in use for the AM fabrication can be reduced by feeding the powder material through the transparent tube 334*t* to create such a state that the powder material adheres to the inner surface of the transparent tube 334*t* by a certain amount before the transparent tube 334*t* is used in the AM fabrication after being replaced, like the present embodiment. For example, the AM apparatus can operate so as to use the transparent tube 334 in the AM fabrication after feeding the powder material through the transparent tube 334*t* until the transparency that the transparent tube 334*t* has when the powder material is not fed therethrough reaches a predetermined value. Further, the AM apparatus operates in such a manner that the transparent tube 334*t*** is replaced with a new one when the transparency that the transparent tube 334*t* has when the powder material is not fed therethrough falls to a further low predetermined value due to continuous use of the transparent tube 334*t* in the AM fabrication.

Figure 11:
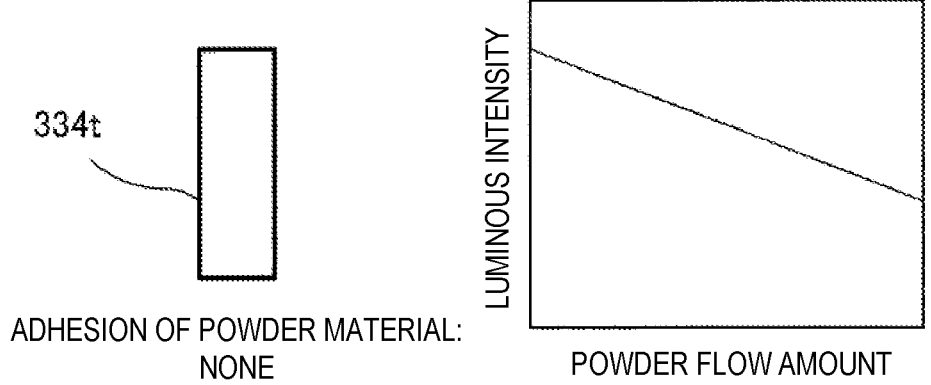
FIG. 11 illustrates examples of a calibration curve when the transparent tube is in a brand-new state with no powder material remaining on the surface of the transparent tube at all, a calibration curve in a state that the powder material adheres/remains on the surface to an intermediate degree, and a calibration curve in a state that the powder material adheres/remains on the surface to a high degree to according to one embodiment.
Figure 11:
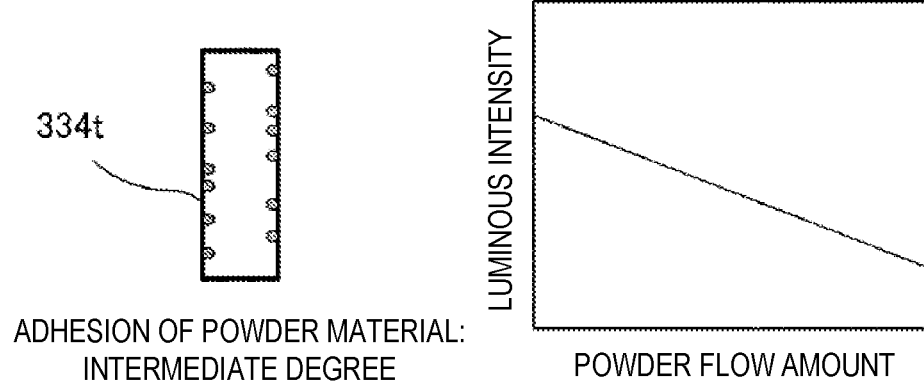
Figure 11:
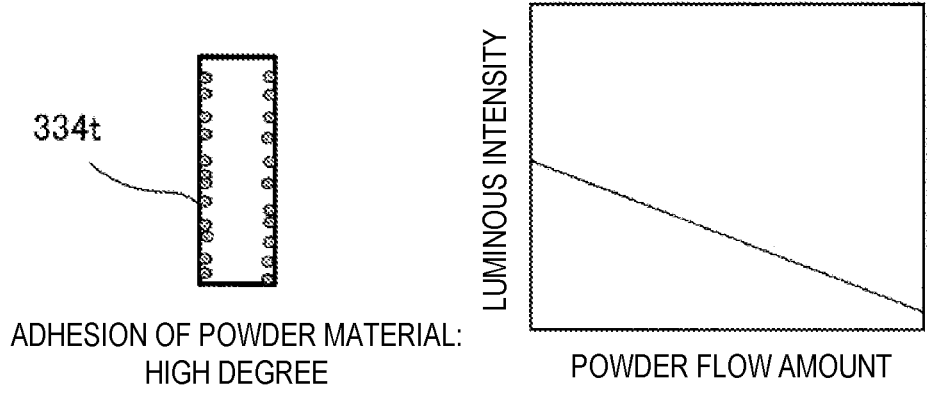

Further, in one embodiment, the calibration curve for calculating the powder flow amount may be changed according to how much the powder material remains on the inner surface of the transparent tube 334*t*. For example, FIG. 11 illustrates examples of a calibration curve when the transparent tube 334*t* is in a brand-new state with no powder material remaining on the surface of the transparent tube 334*t* at all, a calibration curve in a state that the powder material adheres/remains on the surface to an intermediate degree, and a calibration curve in a state that the powder material adheres/remains on the surface to a high degree. As one example, the AM apparatus can operate so as to measure the luminous intensity of the transparent tube 334*t* without the powder material passing therethrough to detect how much the powder material adheres/remains on the transparent tube 334*t*, and select the calibration curve to use, before starting the fabrication. Alternatively, the AM apparatus may operate so as to regularly measure the luminous intensity of the transparent tube 334*t* without the powder material passing therethrough to detect how much the powder material adheres/remains on the transparent tube 334*t*, and select the calibration curve to use, while carrying out the fabrication. As one example, the calibration curve may be selected according to the above-described procedure after fabrication for one layer is ended and before fabrication of the next layer is started.

Figure 12:
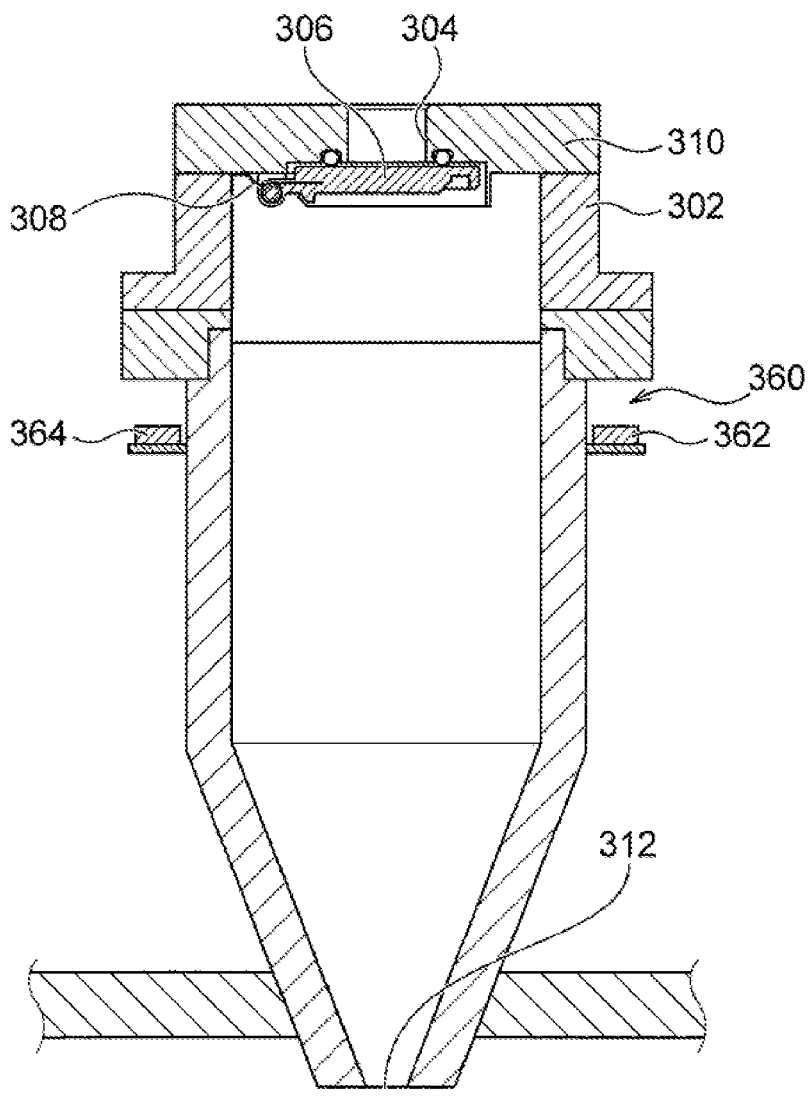
FIG. 12 schematically illustrates the cross-section of the hopper of the material supply device according to one embodiment.

In one embodiment, the material supply device 300 includes a sensor 360 for measuring the height of the powder material held in the hopper 302. FIG. 12 schematically illustrates the cross-section of the hopper 302 of the material supply device 300 according to one embodiment. In the embodiment illustrated in FIG. 12, the sensor 360 of the material supply device 300 includes a light source 362 oriented so as to irradiate the inside of the hopper 302 with light horizontally and a light-receiving element 364 for receiving the light transmitted through inside the hopper 302 at a position of a first height of the hopper 302. The material supply device 300 according to this embodiment can stop the supply of the powder material to the hopper 302 assuming that the powder material is replenished into the hopper 302 by a sufficient amount, when the powder material blocks the light transmitted through inside the hopper 302 to thus prohibit the light from being detected by the light-receiving element 364 during the replenishment of the powder material into the hopper 302.

Further, the sensor 360 in FIG. 12 is a transmission-type sensor, but a reflection-type sensor may be employed as another embodiment. As the reflection-type sensor, for example, the sensor 360 may be constructed in such a manner that a reflection plate is disposed at the position of the light-receiving element 364 in the above-described drawing, FIG. 12 and a light source and a light-receiving element are disposed at the position of the light source 362 in the above-described drawing, FIG. 12, and light reflected from the reflection plate is received by the light-receiving element.

In the embodiment illustrated in FIG. 12, while the powder material is replenished into the hopper 302, the supplied powder material may be piled into a heap to thus hinder the amount of the powder material supplied in the hopper 302 from being correctly detected. In light thereof, in one embodiment, a vibration may be provided to the hopper 302 to prevent the powder material from being heaped while the powder material is supplied into the hopper 302. The vibration provided to the hopper 302 may be, for example, generated by the above-described X-axis movement mechanism 204 or Y-axis movement mechanism 206.

Further, in one embodiment, the amount of the powder material replenished in the hopper 302 may be detected using the above-described weight sensor 320.

Figure 13A:
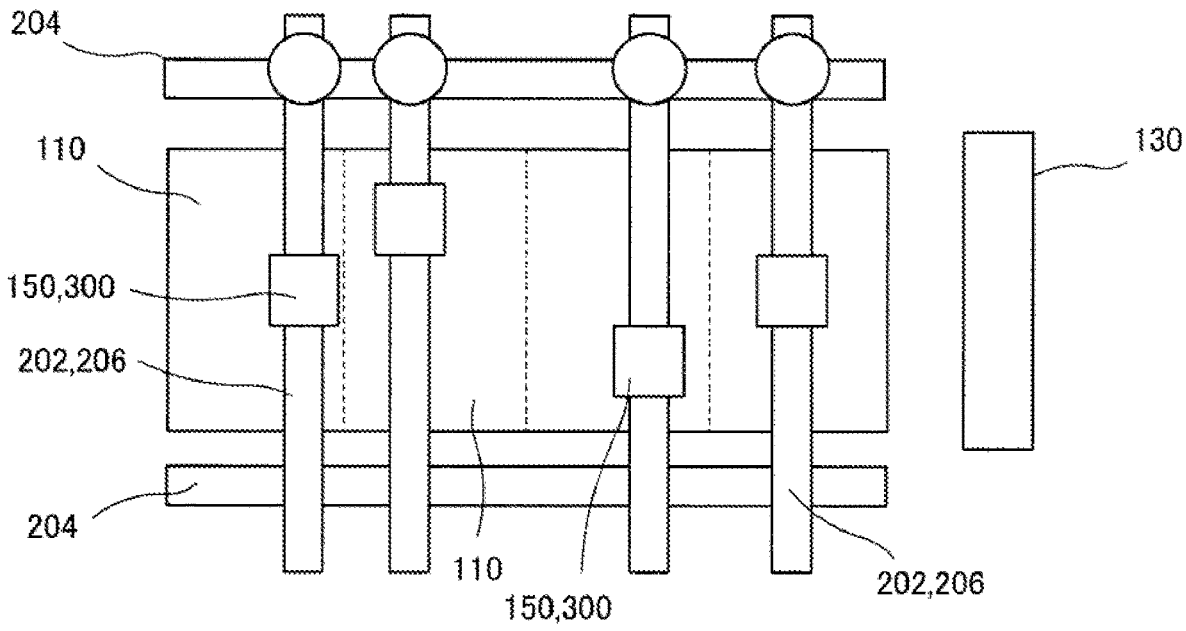
FIG. 13A is a top view schematically illustrating the AM apparatus according to one embodiment.
Figure 13B:
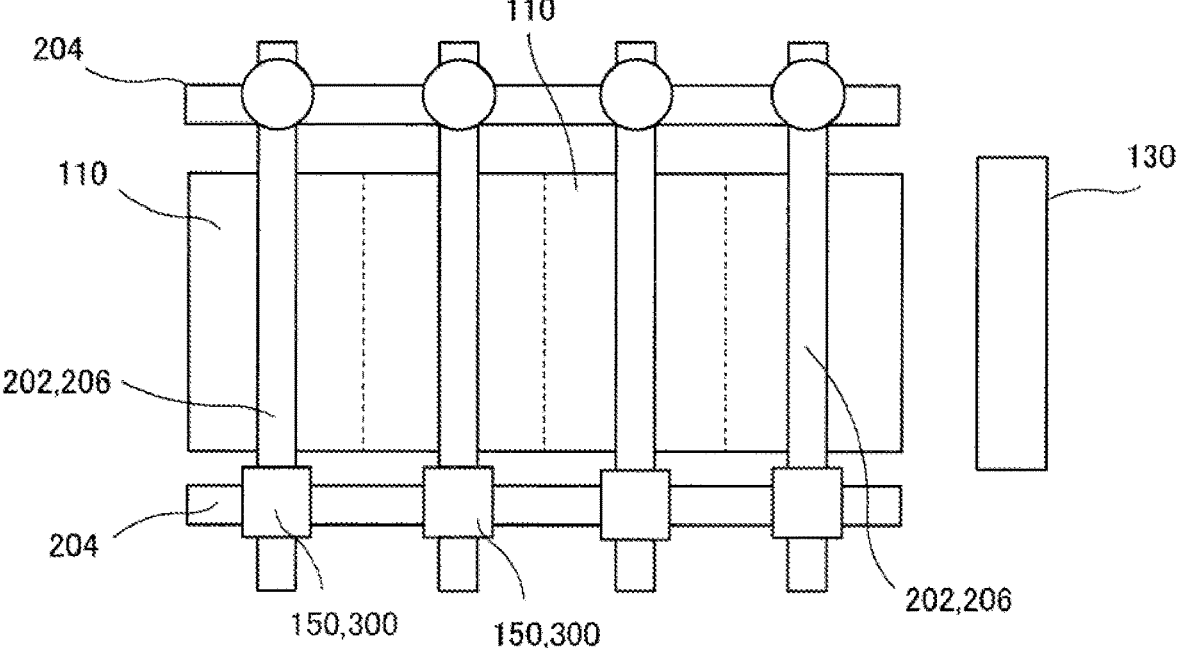
FIG. 13B is a top view schematically illustrating the AM apparatus according to the one embodiment.
Figure 13C:
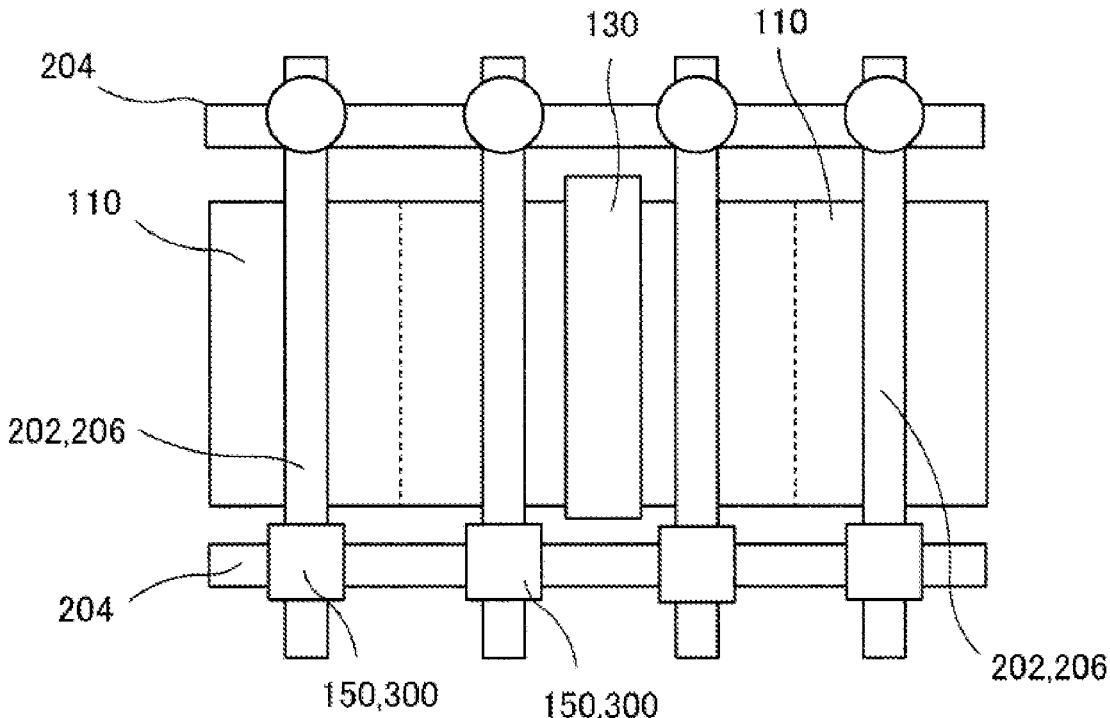
FIG. 13C is a top view schematically illustrating the AM apparatus according to the one embodiment.

FIGS. 13A, 13B, and 13C are top views schematically illustrating the AM apparatus 100 when the AM fabrication is in progress. In the embodiment illustrated in FIGS. 13A to 13C, the AM apparatus 100 includes a plurality of gantry mechanisms 200 and a plurality of DED nozzles 150. These DED nozzles 150 are configured movably in the predetermined fabrication region 110 by the respective gantry mechanisms 200. The AM apparatus 100 according to the present embodiment includes a large fabrication region and can manufacture a relatively large-sized fabrication object due to the pluralities of DED nozzles 150 and gantry mechanisms 200.

FIGS. 13A to 13C are top views schematically illustrating the AM apparatus according to the one embodiment, and illustrate the fabrication in progress. FIG. 13A illustrates the fabrication in progress, and the positions of the gantry mechanisms 200 and the DED nozzles 150 are moved to various positions according to fabrication positions. FIG. 13B illustrates a state that the fabrication for one layer is ended, and each of the DED nozzles 150 is on standby at a retraction position and each of the gantry mechanisms 200 is on standby at a predetermined position. The powder material may be replenished into the material supply device 300 while each of the gantry mechanisms 200 and the DED nozzles 150 are on standby.

In the embodiment illustrated in FIGS. 13A to 13C, the AM apparatus 100 includes a powder bedding mechanism 130. The powder bedding mechanism 130 has a function of bedding the powder material over the fabrication region 110. An arbitrarily structured mechanism can be used as the powder bedding mechanism 130, and, for example, a powder bedding mechanism for use with an AM apparatus based on the PBF method can be used as it. As illustrated in FIG. 13C, the powder bedding mechanism 130 can bed the powder material over the fabrication region 110 when the DED nozzles 150 and the gantry mechanisms 200 are located at the retraction positions and are on standby. As one example, the powder bedding mechanism 130 moves while passing under the Y-axis members 202 of the gantry mechanisms 200 to bed the powder material over the fabrication region 110. After that, the next layer can be fabricated as illustrated in FIG. 13A.

At least the following technical ideas can be recognized from the above-described embodiments.

[Configuration 1] According to a configuration 1, an AM apparatus is provided. This AM apparatus includes a DED nozzle configured to eject a powder material, a gantry mechanism configured to move the DED nozzle, and a powder supply device configured to supply the powder material to the DED nozzle. The gantry mechanism includes a Y-axis member movable in a horizontal X direction and extending in a horizontal Y direction perpendicular to the X direction. The DED nozzle and the material supply device are mounted on the Y-axis member of the gantry mechanism. The gantry mechanism includes a Y-axis movement mechanism for moving the DED nozzle and the material supply device along the Y direction on the Y-axis member.

[Configuration 2] According to a configuration 2, in the AM apparatus according to the configuration 1, the gantry mechanism includes a Z-axis movement mechanism for moving the DED nozzle in a Z direction perpendicular to the X direction and the Y direction.

[Configuration 3] According to a configuration 3, in the AM apparatus according to the configuration 1 or 2, the material supply device includes a container for holding the powder material and a cap attached to an upper end of the container. The cap includes an opening in communication with an inside of the container, a closing member movable between a closing position, at which the closing member closes the opening, and an opening position, at which the closing member opens the opening, and an elastic member configured to bias the closing member to the closing position.

[Configuration 4] According to a configuration 4, the AM apparatus according to the configuration 3 further includes a powder replenishment tube insertable in the opening of the cap. The powder replenishment tube includes a powder passage configured to allow the powder material to pass therethrough, and a gas passage different from the powder passage and configured to allow gas to pass therethrough.

[Configuration 5] According to a configuration 5, in the AM apparatus according to the configuration 4, the powder replenishment tube includes a tapered surface on a distal end side inserted in the opening of the cap, and a powder port for supplying the powder material to the container is formed on a side surface adjacent to a lowest position of the tapered surface.

[Configuration 6] According to a configuration 6, the AM apparatus according to any one of the configurations 1 to 5 further includes a weight sensor configured to measure a weight of the powder material supplied from the material supply device to the DED nozzle.

[Configuration 7] According to a configuration 7, in the AM apparatus according to the configuration 6, the Y-axis movement mechanism is configured to control a movement of the material supply device in such a manner that a horizontal acceleration applied to the weight sensor is kept equal to or lower than a predetermined value.

[Configuration 8] According to a configuration 8, the AM apparatus according to the configuration 6 or 7 further includes an acceleration sensor configured to measure an acceleration applied to the weight sensor.

[Configuration 9] According to a configuration 9, in the AM apparatus according to any one of the configurations 6 to 8, the weight sensor is configured to measure the weight of the material supply device only when the material supply device is stopped or is in a uniform motion.

[Configuration 10] According to a configuration 10, the AM apparatus according to any one of the configurations 1 to 9 further includes a powder supply tube configured to supply the powder material from the material supply device to the DED nozzle, and a sensor configured to measure an amount of the powder material that passes through the powder supply tube.

[Configuration 11] According to a configuration 11, in the AM apparatus according to the configuration 10, at least a part of the powder supply tube is made of a transparent tube that is optically transparent. The AM apparatus further includes a light source configured to irradiate the transparent tube with light, and a light-receiving element configured to receive the light transmitted through the transparent tube.

[Configuration 12] According to a configuration 12, in the AM apparatus according to the configuration 11, the transparent tube is made from an anti-static member.

[Configuration 13] According to a configuration 13, in the AM apparatus according to the configuration 11 or 12, the powder supply tube is coupled with a gas source on an upstream side of the transparent tube.

[Configuration 14] According to a configuration 14, in the AM apparatus according to any one of the configurations 11 to 13, the AM apparatus is configured in such a manner that an inner surface of the transparent tube has a surface roughness equal to or lower than a half of an average particle diameter of the powder material.

[Configuration 15] According to a configuration 15, in the AM apparatus according to any one of the configurations 1 to 14, the material supply device includes a container for holding the powder material. The AM apparatus further includes a light source configured to irradiate an inside of the container with light at a first height of the container, and a light-receiving element configured to receive the light transmitted through the inside of the container at the first height.

[Configuration 16] According to a configuration 16, in the AM apparatus according to any one of the configurations 1 to 15, the material supply device is configured in such a manner that a vibration is provided to the material supply device when the powder material is supplied to the material supply device.

REFERENCE SIGNS LIST

100 AM apparatus
110 fabrication region
130 powder bedding mechanism
150 DED nozzle
200 gantry mechanism
202 Y-axis member
204 X-axis movement mechanism
206 Y-axis movement mechanism
300 material supply device
302 hopper
304 opening
306 closing member
308 elastic member
310 cap
312 hopper exit
320 weight sensor
322 weighing disk
330 carrier gas source
330 gas source
332 gas supply tube
334 powder supply tube
334$t$ transparent tube
340 acceleration sensor
352 light source
354 light-receiving element
356 gas source
362 light source
364 light-receiving element
400 material replenishment tube
402 powder passage
404 tapered surface
406 powder port
408 gas passage
410 opening
500 control device

What is claimed is:

1. An AM apparatus comprising:
a DED nozzle configured to eject a powder material;
a gantry mechanism configured to move the DED nozzle; and
a powder supply device configured to supply the powder material to the DED nozzle, wherein the powder supply device includes a container for holding the powder material and a cap attached to an upper end of the container, and wherein the cap includes an opening in communication with an inside of the container a closing member movable between a closing position, at which the closing member closes the opening, and an opening position, at which the closing member opens the opening, and an elastic member configured to bias the closing member to the closing position, wherein the gantry mechanism includes a Y-axis member movable in a horizontal X direction and extending in a horizontal Y direction perpendicular to the X direction, wherein the DED nozzle and the powder supply device are mounted on the Y-axis member of the gantry mechanism, and wherein the gantry mechanism includes a Y-axis movement mechanism for moving the DED nozzle and the powder supply device along the Y direction on the Y-axis member.

2. The AM apparatus according to claim 1, wherein the gantry mechanism includes a Z-axis movement mechanism for moving the DED nozzle in a Z direction perpendicular to the X direction and the Y direction.

3. The AM apparatus according to claim 1, further comprising a powder replenishment tube insertable in the opening of the cap, wherein the powder replenishment tube includes a powder passage configured to allow the powder material to pass therethrough, and a gas passage different from the powder passage, the gas passage being configured to allow gas to pass therethrough.

4. The AM apparatus according to claim 3, wherein the powder replenishment tube includes a tapered surface on a distal end side inserted in the opening of the cap, and a powder port for supplying the powder material to the container is formed on a side surface adjacent to a lowest position of the tapered surface.

5. The AM apparatus according to claim 1, further comprising a weight sensor configured to measure a weight of the powder material supplied from the powder supply device to the DED nozzle.

6. The AM apparatus according to claim 5, wherein the Y-axis movement mechanism is configured to control a movement of the powder supply device in such a manner that a horizontal acceleration applied to the weight sensor is kept equal to or lower than a predetermined value.

7. The AM apparatus according to claim 5, further comprising an acceleration sensor configured to measure an acceleration applied to the weight sensor.

8. The AM apparatus according to claim 6, wherein the weight sensor is configured to measure the weight of the powder supply device only when the material supply device is stopped or is in a uniform motion.

9. The AM apparatus according to claim 1, further comprising:

a powder supply tube configured to supply the powder material from the powder supply device to the DED nozzle; and a sensor configured to measure an amount of the powder material that passes through the powder supply tube.

10. The AM apparatus according to claim 9, wherein at least a part of the powder supply tube is made of a transparent tube that is optically transparent, and wherein the AM apparatus further includes a light source configured to irradiate the transparent tube with light, and a light-receiving element configured to receive the light transmitted through the transparent tube.

11. The AM apparatus according to claim 10, wherein the transparent tube is made from an anti-static member.

12. The AM apparatus according to claim 10, wherein the powder supply tube is coupled with a gas source on an upstream side of the transparent tube.

13. The AM apparatus according to claim 10, wherein the AM apparatus is configured in such a manner that an inner surface of the transparent tube has a surface roughness equal to or lower than a half of an average particle diameter of the powder material.

14. The AM apparatus according to claim 1, wherein the powder supply device includes a container for holding the powder material, and wherein the AM apparatus further includes a light source configured to irradiate an inside of the container with light at a first height of the container, and a light-receiving element configured to receive the light transmitted through the inside of the container at the first height.

15. The AM apparatus according to claim 1, wherein the powder supply device is configured in such a manner that a vibration is provided to the powder supply device when the powder material is supplied to the powder supply device.

* * * * *